United States Patent [19]

Hausner, Jr.

[11] 4,401,997
[45] Aug. 30, 1983

[54] CHART HAVING IMPROVED SEPARABILITY FROM A STACKED ARRAY

[75] Inventor: George G. Hausner, Jr., Cheektowaga, N.Y.

[73] Assignee: Graphic Controls Corporation, Buffalo, N.Y.

[21] Appl. No.: 357,977

[22] Filed: Mar. 15, 1982

[51] Int. Cl.³ .......................................... G01D 15/24
[52] U.S. Cl. ................................................. 346/137
[58] Field of Search ........................... 346/35, 68, 137

[56] References Cited

U.S. PATENT DOCUMENTS 2,978,287  4/1961  Daugherty ........................ 346/137
4,224,629  9/1980  Welker .............................. 346/137

FOREIGN PATENT DOCUMENTS 1186976  4/1970  United Kingdom ................ 346/137

Primary Examiner—Donald A. Griffin
Attorney, Agent, or Firm—Michael G. Berkman

[57] ABSTRACT

A recording chart of the type carried as one of a stacked array on a chart-driving and changing mechanism which functions periodically to separate the top chart from the stacked array. A zonal portion of the chart adjacent to a slit is integrally deformed to provide an open-ended socket or slot in the chart to facilitate intrusive penetration of a blade-like lip of a rotatable release button or hub of the chart changer, cleanly, between a top chart of the stack and a chart therebeneath, to lift and displace the chart while preventing the release button from cutting into the top chart itself adjacent a blade-facing edge thereof.

7 Claims, 7 Drawing Figures

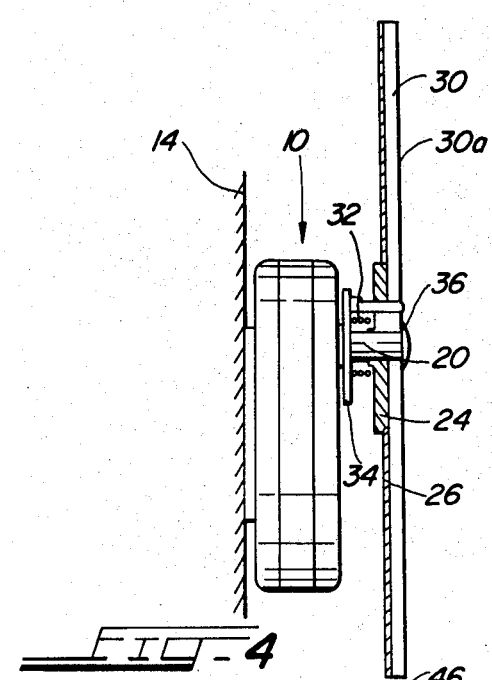
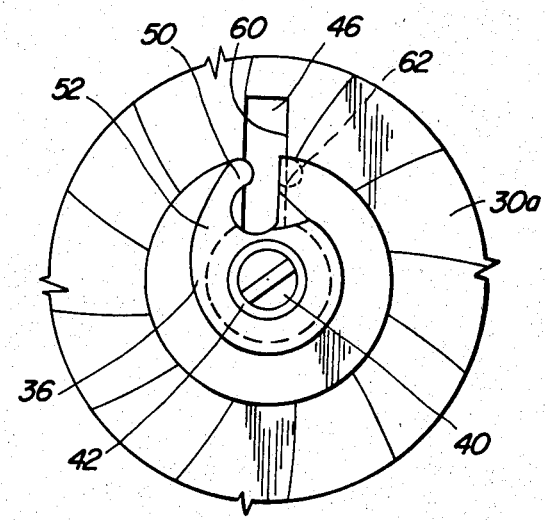
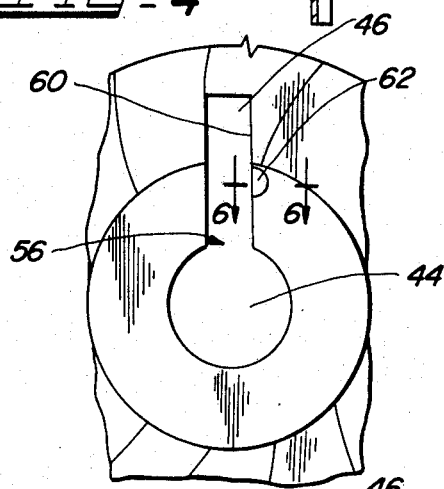
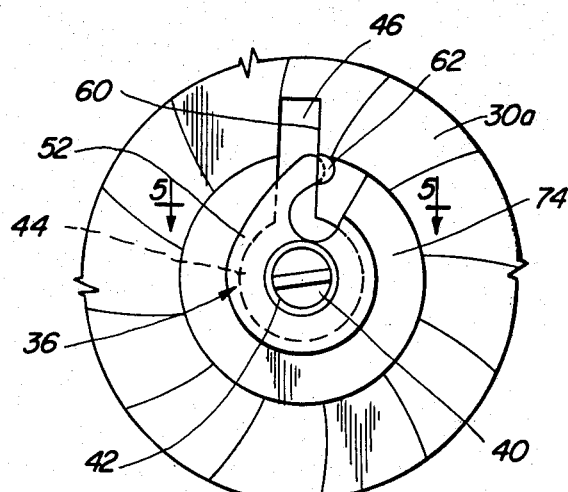
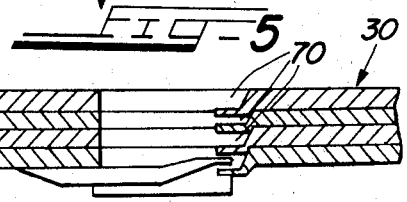
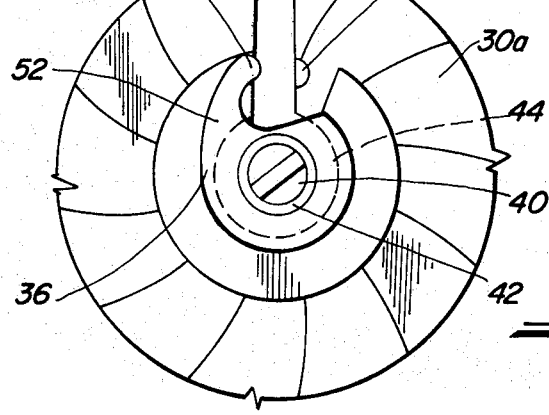
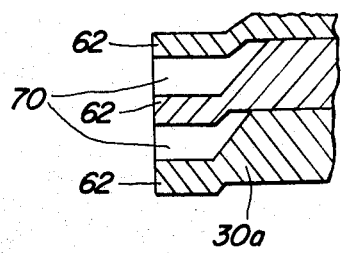

CHART HAVING IMPROVED SEPARABILITY FROM A STACKED ARRAY

BACKGROUND OF THE INVENTION

This invention relates to an improvement in the separability, in sequence, of individual top charts from a stacked array of such charts mounted on a chart-driving and changing mechanism. Such chart-driving and changing mechanisms are well known in the prior art. A motor is used to rotate the chart-carrying apparatus, and a complete rotation of the chart occurs over a predetermined cyclical time period. Typically, the cyclical period is one, twenty-four (24) hour day. Several charts are carried on a support shaft of the chart drive mechanism as a stacked array so that successive charts can be sequentially rotated through the predetermined time period for the recordation of time-correlated data thereon. In each time period, data are recorded on the face of the top chart. At the end of each time cycle, the chart drive mechanism should automatically eject the completed chart into a storage hopper. Data will then be recorded on the next chart of the array.

A crucial functional element of the mechanism in the separation of the top chart from the stacked array of charts is a rotatably shiftable hub or release button having a blade-like edge or terminus which rotates periodically, in a plane generally paralleling a plane of the top chart. At the end of the predetermined recording period, a tensioned spring of the mechanism releases the release button to execute a rotational shift. A lip of the blade-like terminus of the release-button is received beneath the top chart. The rotating release button thus displaces or lifts the top chart from the stacked array, and the top chart is demounted from the support shaft and falls into a storage receptacle.

Ordinary chart paper of the type used in connection with chart changing mechanisms as described are subject to several difficulties. Occasionally, the lip of the blade-like terminus of the rotating hub or release button will encounter the lateral edge of the paper rather than being received beneath the top chart. The blade-like terminus will then cut into the chart and the chart will not be separated from the stacked array of charts therebeneath. As a result, the next period's data will be imprinted or scribed on the same chart as were the previous time period's data. Several change periods may go by before the problem is noted and valuable data could be irretrievably lost. A proposal for reducing the likelihood of chart changing failure is described in U.S. Pat. No. 4,224,629 which discloses a chart recording paper to which a piece of plastic reinforcement has been fitted at a button-presented chart edge. However, this structural chart modification requires a second separate step of placing the reinforcement to envelop the chart edge. The patentee describes no economical way of making the suggested chart modification.

SUMMARY OF THE INVENTION

It is a principal object of the present invention to obviate objectionable invasive edge penetration and tearing of the top chart of a stacked array of charts by the lip of the blade-like terminus of the rotatably shiftable hub or release button of the chart changing machine. It is a feature of the invention that by eliminating the objectionable chart penetration and cutting, sequential separation of the top chart from the stacked array of charts therebeneath is enhanced and facilitated.

A related object of the invention is that this objectionable, tearing penetration is avoided without the use of additional physical elements of the type which must be attached to the chart as auxiliary structures.

A principal feature of the invention is an integrally formed offset sector of the chart. The sector is adjacent to a keyway or cut-out in the chart, and is a limited zonal area of the chart which is permanently displaced a finite distance upwardly from the top surface of the chart itself. The upward displacement zone adjacent to the punched keyway facilitates the entry or the receipt of the lip of the blade-like terminus of the shiftable release button at an open-ended deformation slot or socket preformed in the chart. The structure described enhances the separation of the top chart from the stacked array of charts.

The present invention also avoids any need to place a reinforcement tab on the chart at the edge of the keyway. In accordance with a preferred embodiment of the invention an offset sector is preformed mechanically in each chart, as an integral structural modification of the chart itself.

In a preferred embodiment of the invention, the offset sector is sized and shaped for substantial congruity with the lip of the blade-like terminus of the shiftable release button or hub and is so located as to receive the lip therewithin in line and area contact therewith.

BRIEF DESCRIPTION OF THE DRAWINGS

FIG. 1 is a side elevational view, partly in section, of a chart support drive and changing assembly of the type in which the improved chart of the invention finds utility;

FIG. 2 is a front elevational view showing the chart release button, in a stand-by position;

FIG. 3 is a front elevational view showing the rotatable release button at initiation of its rotational cycle to release the top chart of a stacked array;

FIG. 4 is a front elevational view of the central portion of the chart of the invention showing the integral, zonal chart deformation, according to the invention, for facilitating the sequential changing of the charts carried on the chart changing assembly;

FIG. 5 is a cross-sectional view taken substantially on the lines 5—5 of FIG. 3;

FIG. 6 is a cross-sectional view taken substantially on the lines 6—6 of FIG. 4; and FIG. 7 illustrates a modified hub or release button configuration useful in the present invention.

DETAILED DESCRIPTION OF THE PREFERRED EMBODIMENT

The aims and objects of the invention are accomplished by use of a mechanically offset, integrally formed sector which is stamped into the chart paper. The sector is permanently upwardly displaced from the principal surface of the chart at a zone which includes an edge of a slit preformed in the chart. The slit in the chart is positioned and oriented to receive the lip of a blade-like terminus of a rotatable chart-changing hub or button during periodic, sequential separation of the top chart from the stacked array of charts therebeneath. The integrally deformed sector obviates incisive penetration of the button terminus into the edge of the chart itself.

Referring now to the drawings, and particularly to FIG. 1, there is shown a conventional chart support and drive assembly 10 in conjunction with which the chart of the present invention finds utility. The assembly 10 is mounted on a wall 41 or other vertical support. A standard instrument clock 16 mechanism, which is a functional component of the chart drive assembly 10, rotates a chart support spindle or shaft 20, and a chart support plate 24. Secured to the plate 24 is a turntable, 26 against which a stacked array of charts 30 is secured. In the example of the apparatus shown, the charts 30 are round and the turntable 26 is of a substantially equivalent diameter. The clock 16 controls the rotational speed of the chart support shaft 20, and of the turntable 26. Through the operation of the clock 16 and the drive assembly 10 the stacked array of charts 30 and each chart in turn is rotated through a predetermined time cycle during which period time-correlated data are recorded on the exposed face of the top chart 30a.

The drive assembly 10 also includes a compression spring 32, which is engaged in a groove (not shown) in the support plate 24. The spring 32 acts against a flange 34 to provide compression stress applied to the stacked charts 30 through a rotatable button 36 which is operative during chart-changing.

FIGS. 2 and 3 illustrate schematically the rotatably shiftable hub or button 36, and its functional role of lifting and separating the top chart 30a from the rest of the aligned, stacked array 30 of charts (FIG. 1). The top chart 30a is in concentric coaxial alignment on the spindle-like support shaft 20 (FIG. 1). FIG. 2 shows the button 36 in a rest or stand-by position, being the disposition of the button 36 during each data recording cycle, before sequential separation of each top chart 30a. As shown, the button 36 is attached to the central support shaft 20 (FIG. 1) by means of a nut 40 and ring 42.

Each chart has a conventional spindle-receiving opening 44 which is sized for sleeved encircling of the support shaft 20. A slit 46 in the chart communicates with and extends from the central opening 44. This slit 46 is oriented to receive a lip 50 of the blade-like terminus 52 of the rotatably shiftable hub or release button 36 upon periodic rotation of the hub 36 in a plane generally paralleling a plane of the top chart 30a. Each chart has a conventional keyway-shaped opening 56 known in the trade as a "dog chart slot." This opening serves to locate the chart axially on the support shaft 20, to position and drive the chart in a proper reference mode for recordation of time-correlated data, and to provide an edge 60 oriented to receive therebeneath the lip 50 of the blade-like terminus 52 of the rotatably shiftable release button 36 to facilitate chart changing.

FIG. 3 shows the rotatably shiftable release button 36 at the initiation of its periodic, pulsed rotation to lift and separate the top chart 30a from the stacked array of charts 30 (FIG. 1). The lip 50 of the terminus 52 is shown as being received beneath the slit-bounding edge 60 of the top chart 30a. At the end of a chart rotation cycle, the tensioned release button 36 is released from its stationary, stand-by position and rapidly makes a single rotation about the support shaft 20 and the radially extending blade-like terminus 52 enters or interleaves between the top chart 30a and the stacked array of charts therebeneath 30 (FIG. 1). The top chart 30a is thus separated from the stack, demounted from the support shaft and dropped into a storage bin for subsequent retrieval and examination. A new, next-sequential chart of the stacked array 30 is thus exposed for continued data recordation.

Details of the operation and construction of the chart changer itself are not part of the present invention. Such details are set forth in prior patents including Daugherty U.S. Pat. No. 2,978,287, and the entire disclosure of the latter patent is hereby specifically incorporated herein by reference, to the extent not inconsistent herewith.

The improvement in charts, which is the subject of the present invention, is clearly shown in FIG. 4. The chart is integrally mechanically formed with an offset sector defining an open-ended socket 70 for receiving the blade-like terminus 52 (FIG. 2) of the rotatably shiftable release button 36 (FIG. 2) of the chart drive mechanism 10. This offset sector 62 is positioned at an edge of the dog chart slot 46 to obviate invasive penetration of the hub terminus 52 into the chart edge.

FIG. 6 is an enlarged schematic representation of the offset sector 62 forming the slot 70. The sector 62 is a portion of the chart itself permanently displaced upwardly of the top surface of the chart. Typically, the extent of upward displacement of the offset sector 62 is essentially equivalent to a transverse thickness dimension of the chart. As indicated, at the offset sector 62, the chart has been somewhat compressed, having a thickness less than that of the rest of the chart.

The physical displacement of the offset sector 62 establishes the open-ended socket 70 into which the lip 50 of the blade-like terminus 52 is received. Objectionably invasive penetration of the terminus 52 into to tear the top chart at the slit-bounding edge thereof 60 is prevented. The structure of the invention, as described, facilitates and enhances a reliable "clean" separation of each top chart 30a sequentially, from the stacked array of charts 30a therebeneath.

The offset sector 62 as an integral deformation in the chart paper itself, is conveniently mechanically produced by stamping or applying compression and displacement force to the paper in the precise zone to be modified. The stamping or pressing may render the sector 62 brittle and accordingly more frangible but less likely to rip or tear than the "original" chart.

FIG. 3 illustrates schematically the relative positions of the top charts and the release button lip 50 at the initiation of the rotation of the chart-changing release button 36. The illustration depicts how the upward shift or displacement of the sector 62 at the edge of the dog chart slot 46 prevents the lip 50 of the release button 36 from penetrating or tearing the top chart 30a of the stack at the slit-bounding edge 60 thereof. The displacement of the sector 62 elevates the edge of the chart 30a creating an open-ended socket 70 to receive the lip 50 of the release button. The likelihood of penetration of the blade-like terminus 52 into the chart edge 60 is greatly reduced and clean separation of the top chart 30a from the rest of stacked charts 30 is facilitated.

FIG. 7 illustrates a modified new hub or release button configuration useful with the present invention. As in the release button embodiment of FIGS. 2 and 3, the modified release button of the present invention has a blade-like terminus 52, and operates during periodic chart-changing, release-button 36 rotation to displace and separate a top chart 30a from a stacked array of charts 30 (FIG. 1). However, unlike the prior art release button of FIGS. 2 and 3, an end of the modified button 36 is cut off or truncated at a peripheral zone thereof generally opposed to the blade-like terminus 52. The modification described prevents the button 36 from exerting pressure down upon the offset sector 62 and/or pushing that sector 62 into planar correspondence with the body 30a. Such pressure would tend to reduce the benefits to be derived from the offset structural modification of the chart at the deformed sector. As an alternative to an actual physical excision of that portion of the hub or release button 36 opposite the blade-like terminus 52, the zone 74 of the release button 36 may be "relieved" by bending deformation or otherwise to remove pressure from the chart area therebeneath.

From the foregoing, it is to be understood that the invention is capable of modifications within the disclosed inventive concept. Such modifications may be made without departure from the spirit and scope of the invention as defined in the appended claims.

What is claimed is:

1. In a recording chart mountably positionable as a top chart of an array of stacked charts spindled on a support shaft of a chart drive mechanism for sequentially rotating each chart of the array in turn through a predetermined cyclical time period during recordation of time-correlated data on a face of each of said top chart in turn, said top chart being formed with a central opening sized for sleeved encircling of the support shaft of the chart drive mechanism extending therethrough, a cut-out keyway displaced radially from said central opening of said top chart for orienting said top chart in a predetermined data-receiving reference disposition on the support shaft, a slit formed in said top chart for receiving a lip of a blade-like terminus of a rotatably shiftable hub of a chart-changing mechanism slidably therethrough upon rotation of the terminus of the hub in a plane generally paralleling a plane of said top chart, said blade-like terminus being operable during periodic chart-changing rotation of the hub to displace and to separate said top chart from said stacked array of charts therebeneath and to demount said top chart from the support shaft, thereby to expose a new, next-sequential chart of the stacked array for recordation of data thereon, the improvement comprising:

lip receiving means adjacent said slit to facilitate and enhance reliable separation of said top chart of said stacked array from charts therebeneath and to obviate objectionable invasive penetration of the blade-like terminus of the rotatably shiftable hub into said top chart at a blade-facing slit-bounding edge thereof, said lip receiving means comprising an offset sector adjacent said slit of said top chart, said offset sector being permanently displaced a finite distance upwardly from a top surface of a chart therebeneath to define in said top chart, at a zone thereof including an edge of said slit presented to the rotatable blade-like terminus of the shiftable hub, an open-ended slot for receiving the lip of the blade-like terminus therewithin and under said slit-bounding edge of said top chart, thereby cleanly to interleave the blade-like terminus between said top chart and a chart therebeneath, to separate said top chart from others of the charts in the stacked array.

2. The improvement as set forth in claim 1 wherein the finite distance of displacement of said sector of said chart is equal essentially to a transverse thickness dimension of said top chart.

3. The improvement as set forth in claim 1 wherein said permanently offset sector of said top chart has a transverse through thickness less than that of remaining portions of said top chart.

4. The improvement as set forth in claim 1 wherein said offset sector of said top chart is a deformation resulting from compression forces applied thereto, and wherein applied compression forces have rendered portions of said sector brittle and, accordingly, more frangible than remaining areas of said top chart.

5. The improvement as set forth in claim 4 wherein said offset sector of said top chart is a mechanically produced offset sector of said top chart.

6. The improvement as set forth in claim 1 wherein said lip-receiving means is integrally formed with each chart of said stacked array of charts.

7. In a chart drive mechanism including a chart support shaft for carrying a plurality of stacked charts, a rotatably shiftable chart-changing slotted hub encircling said shaft, a hub lip, said lip defining a blade-like terminus of said hub at a slot in said hub, said blade-like terminus being operable during periodic chart changing rotation of the hub to interleave between a top chart and charts therebeneath to displace and to separate the top chart from a staacked array of charts therebeneath, and to demount the chart from the support shaft; the improvement wherein said hub has a truncated marginal portion opposing said blade-like terminus of said hub, thereby obviating application of hub-derived pressure against the top chart at a zone thereof beneath said truncated marginal portion of said hub and to prevent downward displacement of the top chart in a sector of the chart opposite said blade-like terminus.

* * * * *